United States Patent
Oyama et al.

(10) Patent No.: US 9,667,347 B2
(45) Date of Patent: May 30, 2017

(54) OPTICAL TRANSMITTER, OPTICAL RECEIVER, METHOD OF COMPENSATING NON-LINEAR DISTORTION, AND COMMUNICATION APPARATUS

(71) Applicant: FUJITSU LIMITED, Kawasaki-shi, Kanagawa (JP)

(72) Inventors: Tomofumi Oyama, Kawasaki (JP); Takeshi Hoshida, Kawasaki (JP); Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 112 days.

(21) Appl. No.: 14/446,508

(22) Filed: Jul. 30, 2014

(65) Prior Publication Data

US 2015/0071656 A1    Mar. 12, 2015

(30) Foreign Application Priority Data

Sep. 11, 2013  (JP) .................................. 2013-188670

(51) Int. Cl.
*H04B 10/00* (2013.01)
*H04B 10/58* (2013.01)
(Continued)

(52) U.S. Cl.
CPC ......... *H04B 10/58* (2013.01); *H04B 10/2543* (2013.01); *H04B 10/6163* (2013.01)

(58) Field of Classification Search
CPC . H04B 10/2543; H04B 10/58; H04B 10/6163
See application file for complete search history.

(56) References Cited

U.S. PATENT DOCUMENTS 6,985,549 B1    1/2006 Biracree
7,006,770 B2 *  2/2006 Akiyama ......... H04B 10/25133
                                                  398/147
(Continued)

FOREIGN PATENT DOCUMENTS

EP    2071747    6/2009
FR    WO 2013152962 A1 * 10/2013 ........... H04B 10/614
(Continued)

OTHER PUBLICATIONS

S. Oda, T. Tanimura, T. Hoshida, Y. Akiyama, H. Nakashima, K. Sone, Y. Aoki, W. Yan, Z. Tao, L. Dou, L. Li, J. C. Rasmussen, Y. Yamamoto, and T. Sasaki, "Experimental Investigation on Nonlinear Distortions with Perturbation Back-propagation Algorithm in 224 Gb/s DP-16QAM Transmission," in Optical Fiber Communication Conference, OSA Technical Digest.*

(Continued)

*Primary Examiner* — Ken N Vanderpuye
*Assistant Examiner* — Amritbir Sandhu
(74) *Attorney, Agent, or Firm* — Fujitsu Patent Center

(57) ABSTRACT

A non-linear distortion compensator includes: a first signal generator configured to generate a signal with a second multivalued level lower than a first multivalued level from an input signal; a non-linear distortion calculator configured to calculate non-linear distortion of the signal with the first multivalued level based on the signal with the second multivalued level generated by the first signal generator; and a non-linear compensator configured to compensate the non-linear distortion of the signal with the first multivalued level based on the non-linear distortion calculated by the non-linear distortion calculator.

9 Claims, 18 Drawing Sheets

(51) Int. Cl.
*H04B 10/2543* (2013.01)
*H04B 10/61* (2013.01)

(56) References Cited

U.S. PATENT DOCUMENTS

| | | | | |
|---|---|---|---|---|
| 7,684,712 | B1* | 3/2010 | Roberts | H04B 10/60 375/341 |
| 8,718,180 | B2 | 5/2014 | Vetter et al. | |
| 8,731,105 | B2* | 5/2014 | Bai | H03F 1/3247 375/278 |
| 2007/0274628 | A1* | 11/2007 | Hayee | H04B 10/6971 385/24 |
| 2008/0095284 | A1* | 4/2008 | Hori | H04B 1/707 375/350 |
| 2009/0238304 | A1 | 9/2009 | Vetter et al. | |
| 2009/0324224 | A1* | 12/2009 | Xie | H04B 10/60 398/65 |
| 2010/0074378 | A1 | 3/2010 | Chin | |
| 2010/0209121 | A1* | 8/2010 | Tanimura | H04B 10/611 398/202 |
| 2011/0255879 | A1* | 10/2011 | Xie | H04B 10/2513 398/208 |
| 2012/0063549 | A1* | 3/2012 | Futami | H04L 25/03006 375/320 |
| 2012/0076235 | A1* | 3/2012 | Dou | H04B 10/2939 375/296 |
| 2012/0128377 | A1 | 5/2012 | Hatae et al. | |
| 2012/0141130 | A1 | 6/2012 | Nakashima | |
| 2012/0148260 | A1* | 6/2012 | Akiyama | H04B 10/588 398/184 |
| 2012/0201546 | A1* | 8/2012 | Mizuochi | H04B 10/25137 398/147 |
| 2013/0108260 | A1 | 5/2013 | Yan et al. | |
| 2013/0243125 | A1* | 9/2013 | Matsubara | H04B 1/62 375/297 |
| 2013/0259480 | A1* | 10/2013 | Oyama | H04B 10/2557 398/65 |
| 2013/0259485 | A1* | 10/2013 | Wang | H04B 10/58 398/115 |
| 2014/0093255 | A1* | 4/2014 | Liu | H04B 10/6161 398/208 |
| 2014/0145788 | A1* | 5/2014 | Matsubara | H03F 1/3258 330/149 |
| 2014/0301724 | A1* | 10/2014 | Graham | H05B 3/0071 392/407 |
| 2014/0308047 | A1* | 10/2014 | Mak | H04B 10/5055 398/182 |
| 2015/0071630 | A1* | 3/2015 | Oyama | H04B 10/6163 398/25 |
| 2015/0071652 | A1* | 3/2015 | Zhuge | H04B 10/697 398/158 |
| 2015/0071656 | A1* | 3/2015 | Oyama | H04B 10/58 398/194 |
| 2015/0077179 | A1* | 3/2015 | Matsubara | H03F 3/24 330/149 |
| 2015/0256264 | A1* | 9/2015 | Chen | H04B 10/588 398/192 |
| 2015/0280856 | A1* | 10/2015 | Nakashima | H04B 10/614 398/65 |
| 2016/0036554 | A1* | 2/2016 | Yasuda | H04B 10/6161 398/65 |
| 2016/0094296 | A1* | 3/2016 | Hongou | H04B 10/58 398/25 |

FOREIGN PATENT DOCUMENTS

| | | |
|---|---|---|
| JP | 2008-211493 | 9/2008 |
| JP | 2009-278613 | 11/2009 |
| JP | 2011-089945 | 5/2011 |
| JP | 2012-075097 | 4/2012 |
| JP | 2012-120010 | 6/2012 |
| JP | 2014-107736 | 6/2014 |
| WO | 2010/100763 A1 | 9/2010 |
| WO | 2012/006575 | 1/2012 |

OTHER PUBLICATIONS

W. Yan, Z. Tao, L. Dou, L. Li, S. Oda, T. Tanimura, T. Hoshida, and J. C. Rasmussen, "Low Complexity Digital Perturbation Back-propagation," in 37th European Conference and Exposition on Optical Communications, OSA Technical Digest (CD) (Optical Society of America, 2011), paper Tu.3.A.2.*

Liu, Xiang, et al. "Phase-conjugated twin waves for communication beyond the Kerr nonlinearity limit." (2013).*

Jian Hong Ke; Kang Ping Zhong; Ying Gao; Cartledge, J.C.; Karar, A.S.; Rezania, M.A., "Linewidth-Tolerant and Low-Complexity Two-Stage Carrier Phase Estimation for Dual-Polarization 16-QAM Coherent Optical Fiber Communications," in Lightwave Technology, Journal of , vol. 30, No. 24, pp. 3987-3992, Dec. 15, 2012.*

Rezania M A et al., "Blind adaptive equalization algorithm based on constellation transformation for DP 16-QAM systems", Optical Fiber Communication Conference and Exposition and the National Fiber Optic Engineers Conference (OFC/NFOEC), 2013, IEEE, Mar. 17, 2013 (Mar. 17, 2013), pp. 1-3, XP032426715, ISBN: 978-1-4799-0457-0.

Jian Hong Ke et al., "Linewidth-Tolerant and Low-Complexity Two-Stage Carrier Phase Estimation for Dual-Polarization 16-QAM Coherent Optical Fiber Communications", Journal of Lightwave Technology, IEEE Service Center, New York, NY, US, vol. 30, No. 24, Dec. 1, 2012 (Dec. 1, 2012), pp. 3987-3992, XP011474985, ISSN: 0733-8724, DOI: 10.1109/JLT.2012.2208448.

EESR—Extended European Search Report mailed on Feb. 23, 2015 for European Patent Application No. 14180633.1.

USPTO, [JACOB]—Non-Final Rejection mailed on Sep. 24, 2015 for related U.S. Appl. No. 14/461,167 (pending).

EESR—The Extended European Search Report mailed on Mar. 9, 2015 for European Patent Application No. 14182091.0.

Khairuzzaman et al.,"Equalization of nonlinear transmission impairments by maximum-likelihood-sequence estimation in digital coherent receivers"; Optics Express; vol. 18, No. 5; Mar. 1, 2010; pp. 4776-4782; Optical Society of America. [XP002736345] [EESR mailed on Mar. 9, 2015 for related EP Application No. 14182091.0].

USPTO, [JACOB], Interview Summary, mailed on Oct. 15, 2015 for related U.S. Appl. No. 14/461,167 (pending).

JPOA—Office Action of Japanese Patent Application No. 2013-188670 dated Dec. 20, 2016, with partial English translation of the Office Action.

JPOA—Office Action of Japanese Patent Application No. 2013-188671 dated Jan. 10, 2016, with partial English translation of the Office Action.

* cited by examiner

SETTING EXAMPLE OF
APPROXIMATE SYMBOL
(SET AT LEAST ONE POINT)

OPTICAL TRANSMITTER, OPTICAL RECEIVER, METHOD OF COMPENSATING NON-LINEAR DISTORTION, AND COMMUNICATION APPARATUS

CROSS-REFERENCE TO RELATED APPLICATION

This application is based upon and claims the benefit of priority of the prior Japanese Patent Application No. 2013-188670, filed on Sep. 11, 2013, the entire contents of which are incorporated herein by reference.

FIELD

The embodiments discussed herein are related to a non-linear distortion compensator and method, and a communication apparatus.

BACKGROUND

In a communication system, a technology to improve signal quality by performing digital signal processing on signals in a transceiver have been generally used. The technology to improve signal quality using digital signal processing have already been put to practical use from the past in radio communication. Recently, in an optical communication field, a digital coherent communication system in which a digital signal processing circuit is installed in a transceiver has been studied.

The digital signal processing may compensates, for example, imperfection of a device used for a communication apparatus or deterioration of a signal on a transmission line. For example, JP 2012-120010 A or JP 2009-278613 A discloses that an amplitude, a frequency, a polarization, or the like of signal is controlled by digital signal processing on a transmission side.

Here, one of compensation targets of the digital signal processing is non-linearity of characteristics of a transceiving device such as an amplifier (AMP), non-linear characteristics of a transmission line, or the like. The non-linearity of characteristics of the transceiving device is a compensation target common to the radio communication field and the optical communication field. In contrast, non-linear characteristics or wavelength dispersion characteristics of optical fibers used for an optical transmission line is a compensation target unique to the optical communication fieldnon-linearnon-linearnon-linearnon-linear.

One of technologies for pre-equalizing wavelength dispersion characteristics of optical fibers on a transmission side is disclosed in JP 2008-211493 A. Meanwhile, one of technologies for compensating deterioration of signals caused by non-linear characteristics of an optical fiber is disclosed in JP 2012-075097 Anon-linear.

As one of methods for increasing communication capability, a technology for increasing a multivalued level in a modulation scheme is considered. However, as the multivalued level is increased, a higher signal-to-noise ratio (SNR) would be required. The SNR is improved by increasing power of a signal input to an optical fiber used for a transmission line. However, due to the non-linear characteristics of the optical fiber, as the power of an input signal increases, a signal would remarkably deteriorate due to non-linear distortion.

With respect to the above-described problem, JP 2012-075097 A discloses a technology for compensating non-linear distortion by using digital signal processing on a transmission side. According to JP 2012-075097 A, propagation of a polarization multiplexed optical signal in an optical fiber is modeled by the Manakov equation as in Equation (A) below.

$$\frac{\partial}{\partial z} u_H(t, z) + \frac{\alpha(z)}{2} u_H(t, z) + j\frac{\beta_1(z)}{2}\frac{\partial}{\partial t^2} u_H(t, z) = \quad (A)$$
$$j\gamma(z)[|u_H(t, z)|^2 + |u_V(t, z)|^2]u_H(t, z)$$
$$\frac{\partial}{\partial z} u_V(t, z) + \frac{\alpha(z)}{2} u_V(t, z) + j\frac{\beta_2(z)}{2}\frac{\partial}{\partial t^2} u_V(t, z) = $$
$$j\gamma(z)[|u_V(t, z)|^2 + |u_H(t, z)|^2]u_V(t, z)$$

In Equation (A), $u_H(t, z)$ and $u_V(t, z)$ indicate electric field components of horizontal polarized and vertical polarized signals at a time t and a position z, respectively. Further, $\alpha(z)$, $\beta_2(z)$, and $\gamma(z)$ indicate a damping coefficient, a dispersion coefficient, and a non-linear coefficient of a fiber at the position z, respectively.

The non-linear distortion is obtained by solving a differential equation expressed in Equation (A) above. However, since it is complex to obtain a solution analytically, non-linear distortion obtained by using approximation is used for non-linear compensation.

In the technology disclosed in JP 2012-075097 A, the Manakov equation expressed in Equation (A) is analyzed using the perturbation theory and the non-linear distortion is compensated on the transmission side. That is, solutions $u_H(t=kT, z=L)$ and $u_V(t=kT, z=L)$ of non-linear propagation of a horizontal polarized (H polarized) component and a vertical polarized (V polarized) component at a position L of a k-th symbol are expressed as in Equation (B) below and analyzed.

$$u_H(kT,L)=u_H(kT,0)+\Delta u_H(k) \quad u_V(kT,L)=u_V(kT,0)+\Delta u_V(k) \quad (B)$$

Here, $u_H(kT, 0)/u_V(kT, 0)$ indicates an electric field at a position z=0 of the H/V polarized component and $\Delta u_H(k)/\Delta u_V(k)$ indicates a perturbation term by a non-linear effect of the H/V polarized component.

When a signal of a k-th symbol of the H/V polarized component is considered to be a pulse with an amplitude $A_k^{H/V}$, Equation (C) below can be obtained.

$$u_H(t = kT, z = L) = u_H(t = kT, 0) + \quad (C)$$
$$\sum_{m,n}\{[A_{m+k}^H A_{n+k}^H (A_{m+n+k}^H)^* + A_{m+k}^H A_{n+k}^V (A_{m+n+k}^V)^*] \times C(m, n, z = L)\}$$
$$u_V(t = kT, z = L) = u_V(t = kT, 0) + $$
$$\sum_{m,n}\{[A_{m+k}^V A_{n+k}^V (A_{m+n+k}^V)^* + A_{m+k}^V A_{n+k}^H (A_{m+n+k}^H)^*] \times C(m, n, z = L)\}$$
$$C(m, n, z = L) = j\int_0^L \frac{\gamma(z)p(z)}{\sqrt{1 + 2js(z)/\tau^2 + 3(s(z)/\tau^2)^2}}\exp$$
$$\left\{-\frac{3mnT^2}{\tau^2(1 + 3js(z)/\tau^2)} - \frac{(m-n)^2 T^2}{\tau^2[1 + 2js(z)/\tau^2 + 3(s(z)/\tau^2)^2]}\right\}dz$$

Here, m and n are integers. Further, p(z) indicates a signal power at the position z, s(z) indicates a total accumulated dispersion value in a transmission path for the purpose of propagation at the position z, τ indicates a half width of a pulse, and T indicates a pulse period. As understood from Equation (C) above, the perturbation term by the non-linear effect of the H/V polarized component indicates a sum of products of three amplitudes $A_k^{H/V}$. Further, C(m, n, z=L) is coefficient indicating the degree that a product of amplitudes in a combination of given n and m becomes non-linear distortion and is obtained by perturbation analysis.

However, when the technology disclosed in JP 2012-075097 A is applied to a multivalued modulation scheme, multiplication of signal amplitudes included in calculation of the non-linear distortion becomes more complicated as a multivalued level of a signal is increased, thereby resulting in an enormous increase in a circuit scale of a signal processing circuit.

SUMMARY

According to an aspect of the embodiments, a non-linear distortion compensator that compensates non-linear distortion of a signal with a first multivalued level and including: a first signal generator configured to generate a signal with a second multivalued level lower than the first multivalued level from an input signal; a non-linear distortion calculator configured to calculate non-linear distortion of the signal with the first multivalued level based on the signal with the second multivalued level generated by the first signal generator; and a non-linear compensator configured to compensate the non-linear distortion of the signal with the first multivalued level based on the non-linear distortion calculated by the non-linear distortion calculator.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
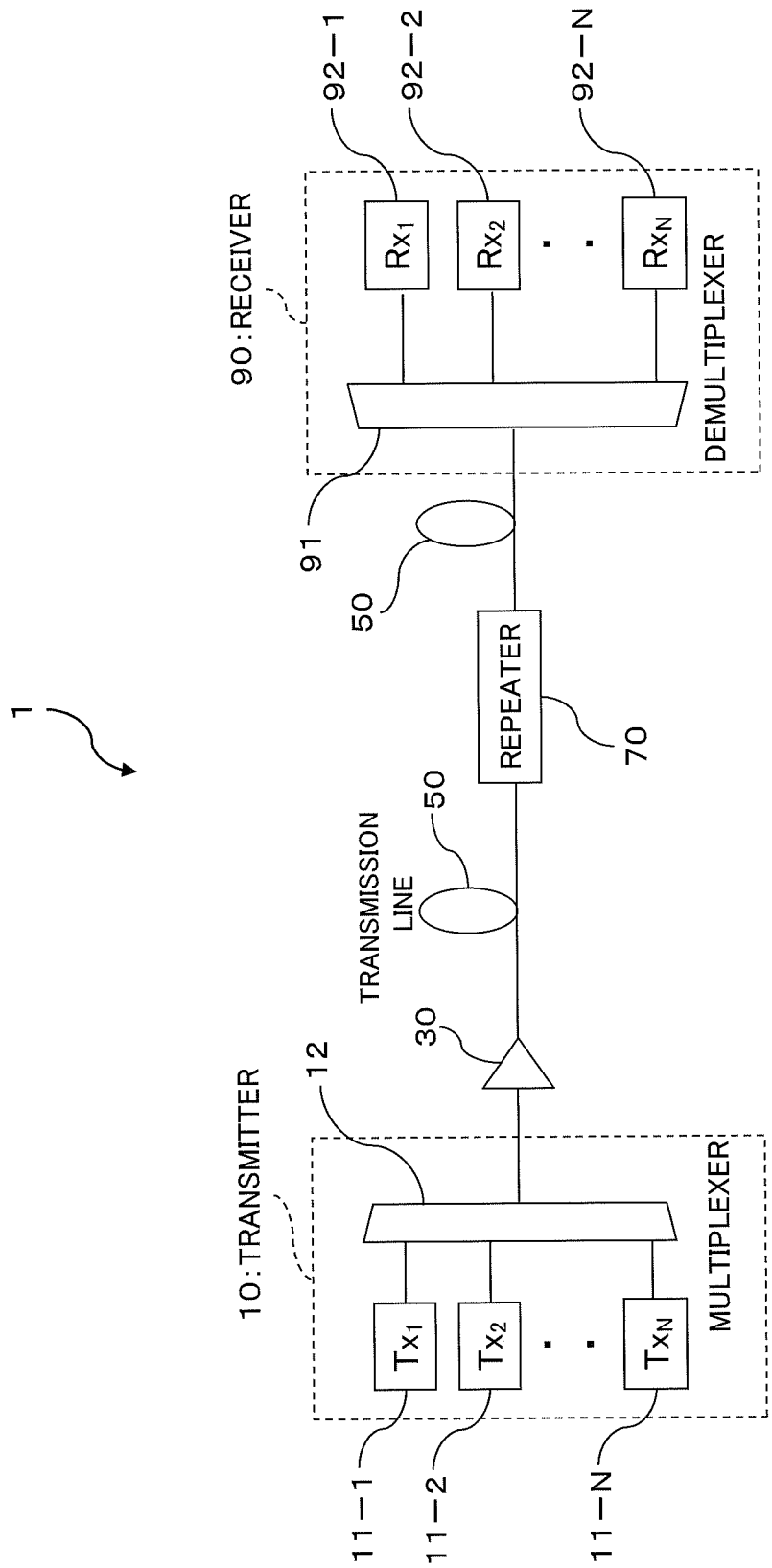
FIG. 1 is a block diagram illustrating an example of an optical communication system according to an embodiment.

Hereinafter, embodiments of the present invention will be described with reference to the drawings. However, the embodiments described below are merely examples and various modifications or applications of the technology not specified below are not intended to be excluded. Further, throughout the drawings used in the following embodiments, portions to which the same reference numerals are given indicate the same or equivalent portions unless otherwise stated.

FIG. 1 is a block diagram illustrating an example of an optical communication system according to an embodiment. The optical communication system 1 illustrated in FIG. 1 is, for example, a wavelength division multiplexing (WDM) optical transmission system which transmits wavelength division multiplexed (WDM) light. The WDM optical transmission system 1 includes, for example, a WDM optical transmitter 10, an optical transmission line 50 using an optical fiber, and a WDM optical receiver 90.

The WDM optical transmitter 10 transmits a WDM optical signal obtained by wavelength multiplexing optical signals with multiple wavelengths (channels) to the optical transmission line 50, and the WDM optical receiver 90 demultiplexes the WDM optical signal transmitted through the optical transmission line 50 into optical signals for each wavelength and receives the wavelength signals. The WDM optical transmitter 10 and the WDM optical receiver 90 are examples of communication apparatuses.

One or more of optical amplifiers 30 or one or more of repeaters 70 may be provided for the optical transmission line 50 according to a transmission distance of the WDM optical signal from the WDM optical transmitter 10 to the WDM optical receiver 90.

The WDM optical transmitter 10 includes, for example, optical transmitters 11-1 to 11-N (where N is an integer equal to or greater than 2) provided for respective wavelengths and a multiplexer 12 that performs wavelength multiplexing (combining) on optical signals transmitted by the optical transmitters 11-1 to 11-N to generate a WDM optical signal and outputs the generated WDM optical signal.

Meanwhile, the WDM optical receiver 90 includes, for example, a demultiplexer 91 that demultiplexes the WDM optical signal received from the optical transmission line 50 into optical signals with the wavelengths and optical receivers 92-1 to 92-N that receives the optical signals with the respective wavelengths demultiplexed by the demultiplexer 91.

Figure 2:
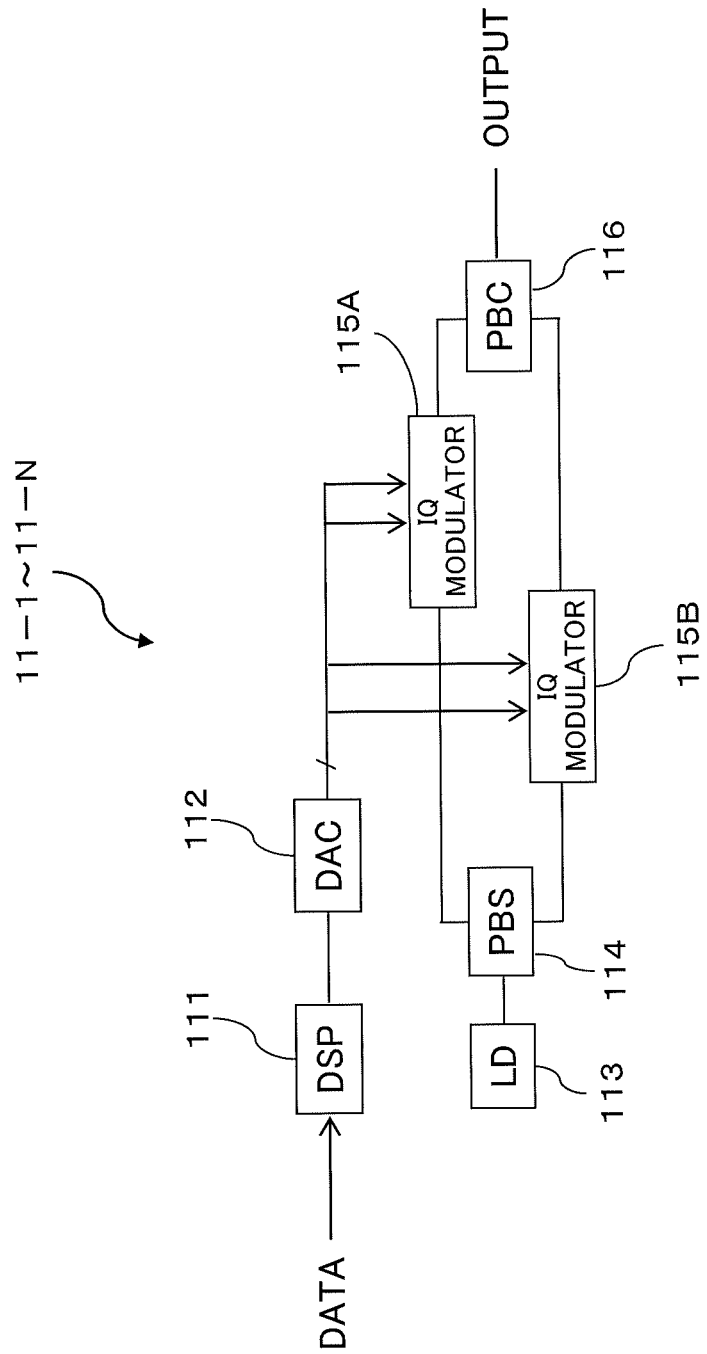
FIG. 2 is a block diagram illustrating an example of the configuration of an optical transmitter illustrated in FIG. 1.

Each of the optical transmitters 11-1 to 11-N may be an optical transmitter which transmits a single-polarized signal or may be an optical transmitter which transmits polarization multiplexed signals. An example of the configuration of the latter polarization multiplexed signal transmitter is illustrated in FIG. 2. The polarization multiplexed signal transmitter illustrated in FIG. 2 includes a digital signal processor (DSP) 111, a digital-analog converter (DAC) 112, a light source (laser diode, LD) 113, a beam splitter (BS) 114, IQ modulators 115A and 115B for an H-polarized wave and a V-polarized wave, and a polarized beam combiner (PBC) 116.

The DSP 111 is an example of an arithmetic processing circuit and performs digital signal processing for non-linear pre-equalization to be described below on a transmission data signal.

The DAC 112 converts the transmission data signal processed as a digital signal by the DSP 111 into an analog signal and inputs the analog signal to the IQ modulators 115A and 115B.

The light source 113 outputs transmission light, and the BS 114 splits the transmission light of the light source 113 into two transmission lights to input the split lights to the IQ modulators 115A and 115B.

The IQ modulators 115A and 115B each perform multi-valued modulation (IQ-modulation) on the split transmission light input from the BS 114 according to the analog transmission data signal input from the DAC 112. One of the IQ modulators 115A and 115B outputs an optical modulated signal corresponding to the H-polarized component and the other thereof outputs an optical modulated signal corresponding to the V-polarized component.

The PBC 116 performs polarization combination on the optical modulated signals of the polarized components from the IQ modulators 115A and 115B and outputs the combined signal.

Figure 3:
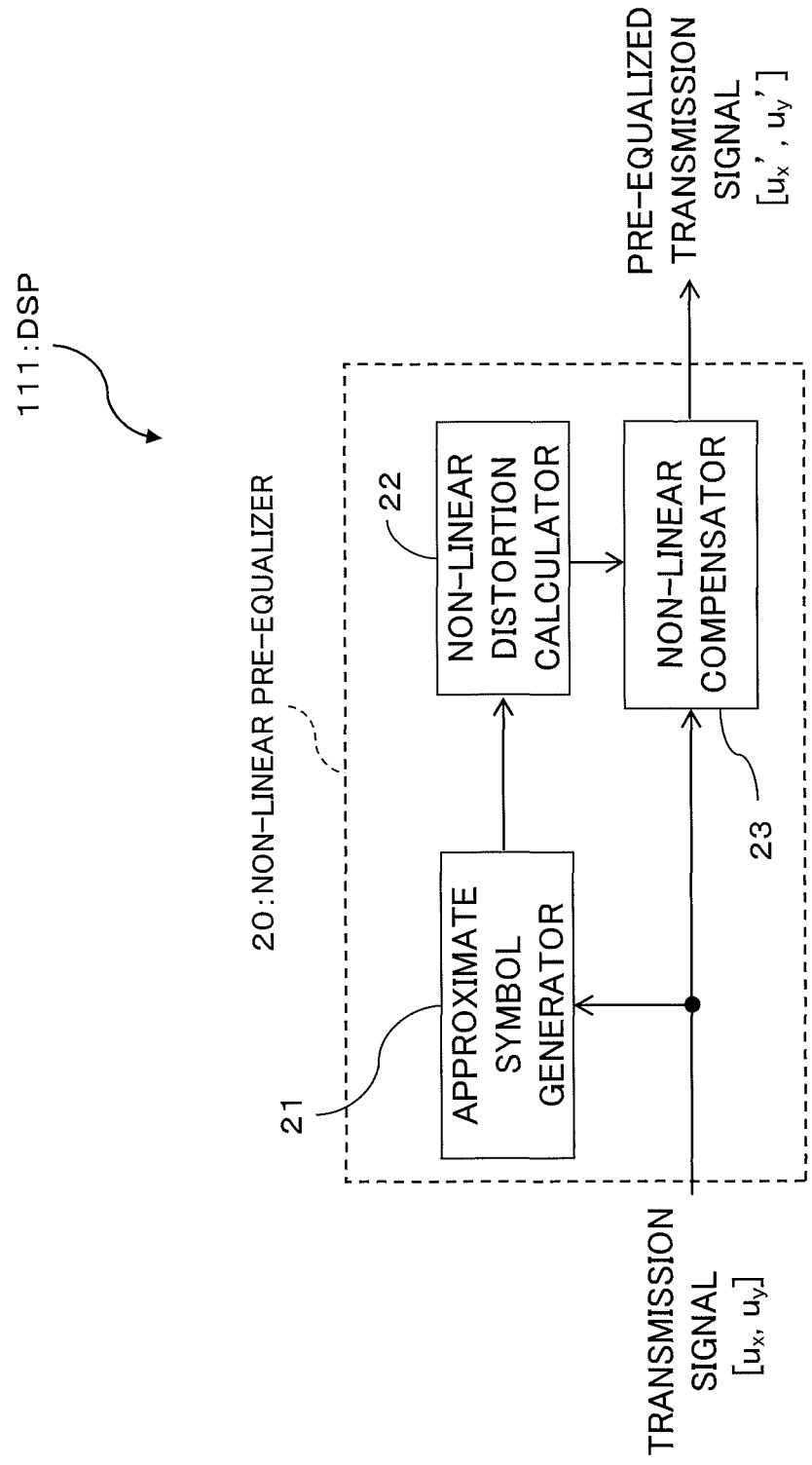
FIG. 3 is a block diagram illustrating an example of the configuration of a non-linear pre-equalizer realized by a DSP illustrated in FIG. 2.

For example, as illustrated in FIG. 3, the above-described DSP 111 includes, upon focusing on the functional configuration thereof, a non-linear pre-equalizer 20 configured to include an approximate symbol generator 21, a non-linear distortion calculator 22, and a non-linear compensator 23.

The non-linear pre-equalizer 20 is an example of a non-linear distortion compensator and performs non-linear distortion pre-equalization on the transmission signal.

The approximate symbol generator 21 is an example of a first signal generator and generates a signal (approximate symbol) of a multivalued level (second multivalued level) lower than a multivalued level (first multivalued level) from the input signal when the input signal is mapped to electric field information (symbol) on a complex (IQ) plane and is transmitted.

For example, when a signal transmitted to the optical transmission line 50 is an M-QAM (or PSK) signal (where M indicates a multivalued level and is, for example, 8, 16, 64, 256, or the like), the approximate symbol generator 21 generates a signal (for example, a QPSK symbol) with a multivalued level lower than M.

Figure 4:
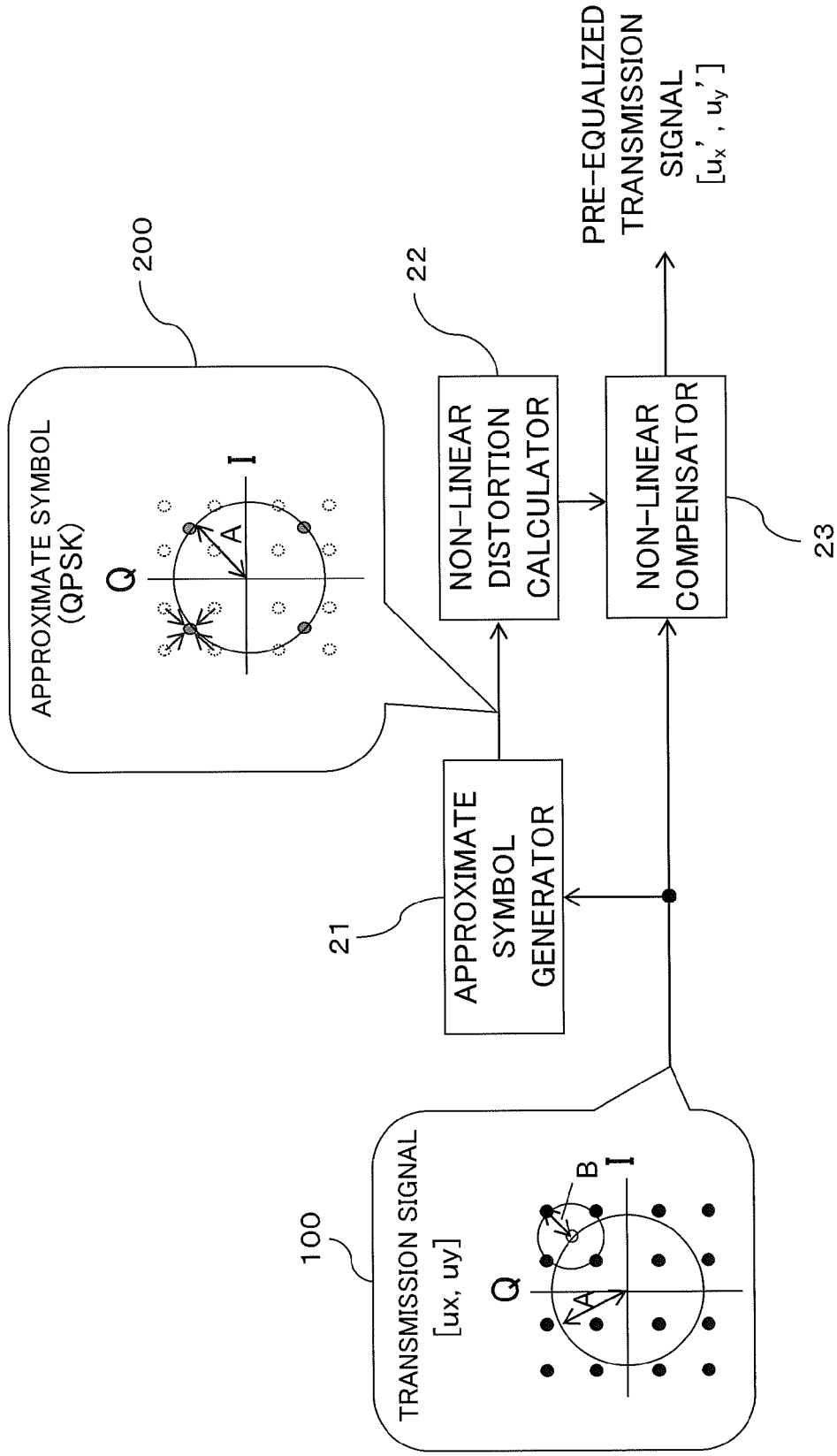
FIG. 4 is a diagram for describing an example in which an approximate symbol (QPSK symbol) is generated from a 16QAM signal in an approximate symbol generator illustrated in FIG. 3.
Figure 5:
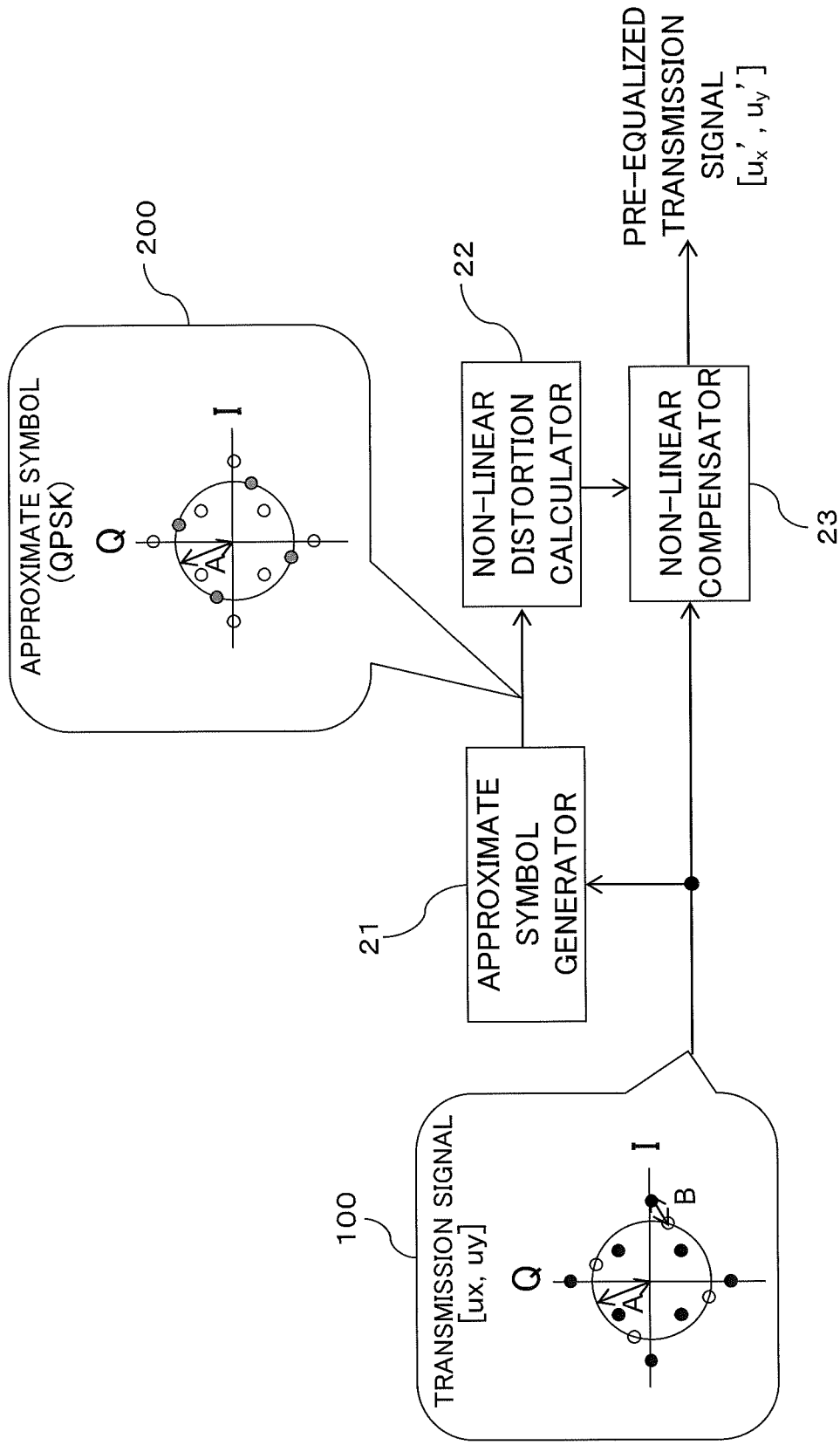
FIG. 5 is a diagram for describing an example in which an approximate symbol (QPSK symbol) is generated from an 8QAM signal in the approximate symbol generator illustrated in FIG. 3.
Figure 6:
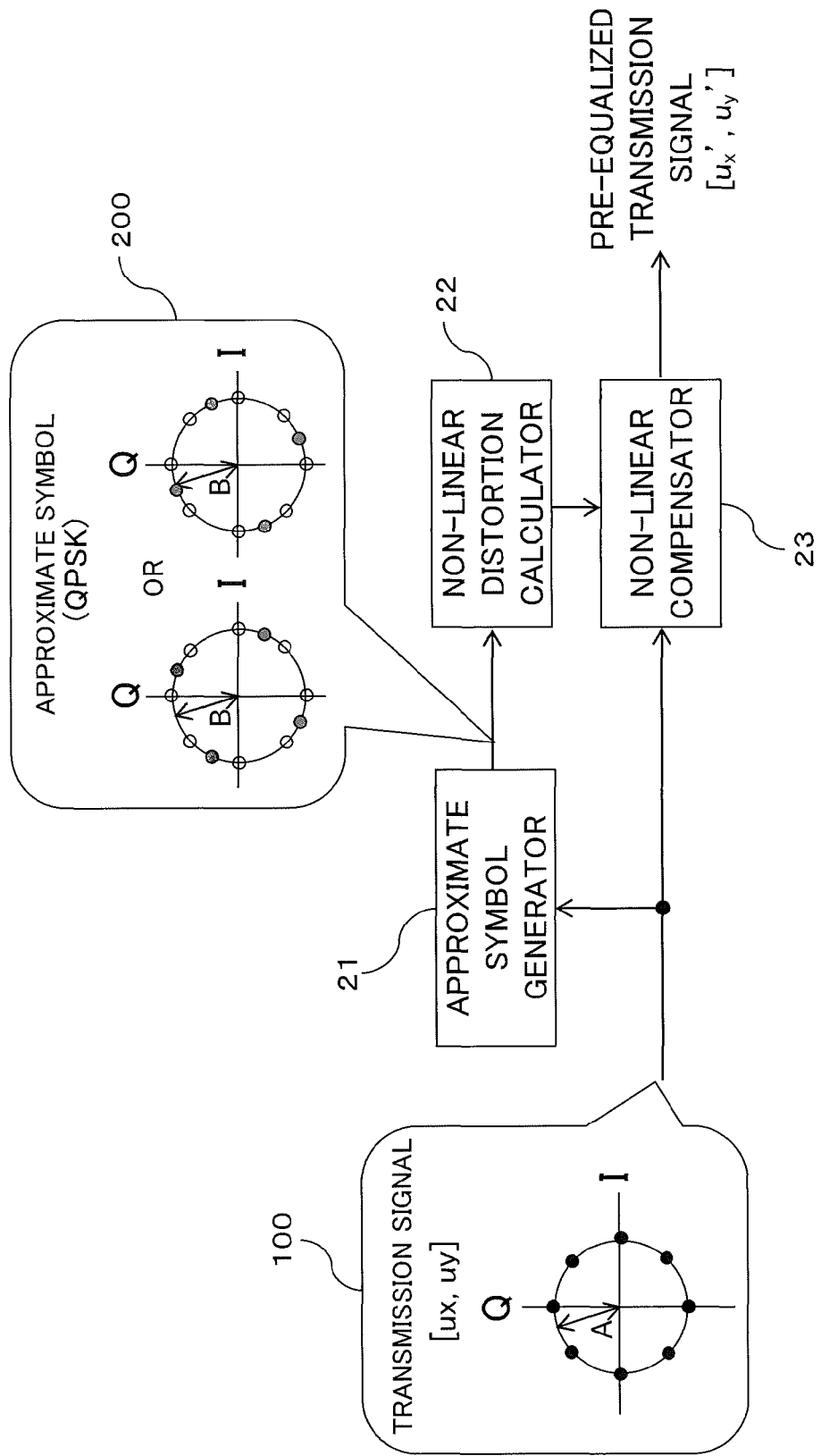
FIG. 6 is a diagram for describing an example in which an approximate symbol (QPSK symbol) is generated from an 8PSK signal in the approximate symbol generator illustrated in FIG. 3.

FIGS. 4 to 6 illustrate examples in which signals of 16QAM, 8QAM, and 8PSK are degenerated (re-mapped) to QPSK symbols in the approximate symbol generator 21, respectively.

In the case of FIG. 4 (16QAM signal), a 16QAM signal $u(k)$ can be expressed by addition of two QPSK symbols, as exemplified in Equation (1.1) below (see a frame 100 in FIG. 4). In this case, the approximate symbol generator 21 generates an approximate symbol (QPSK symbol) $u''(k)$ by omitting the second term of Equation (1.1), as exemplified in Equation (1.2) below (see a frame 200 in FIG. 4).

$$u(k)=A\exp(j\phi_1(k))+B\exp(j\phi_2(k)) \quad (1.1)$$

$$u''(k)=A\exp(j\phi_1(k)) \quad (1.2)$$

where $\phi_i(k) \in [\pi/4, 3\pi/4, 5\pi/4, 7\pi/4]$ and $A=\sqrt{2}\times B$

When this scheme is applied to the perturbation method disclosed in JP 2012-075097 A described before, the number of possible values taken by the product of the three terms of the amplitude $A_k^{H/V}$ expressed in the aforementioned Equation (C) is decreased. For example, the number of values taken by the products of three amplitude terms is 256 in the case of 16QAM but is 4 in the case of QPSK.

In the case of FIG. 5 (8QAM signal), an 8QAM signal can be expressed by addition of a QPSK symbol and a BPSK symbol, as indicated in Equation (2.1) below (see a frame 100 in FIG. 5). In this case, the approximate symbol generator 21 generates an approximate symbol (QPSK symbol) $u''(k)$ by omitting the second term of Equation (2.1), as indicated in Equation (2.2) below (see a frame 200 in FIG. 5).

$$u(k)=A\exp(j\phi_1(k))+B\exp(j\phi_2(k)) \quad (2.1)$$

$$u''(k)=A\exp(j\phi_1(k)) \quad (2.2)$$

where $\phi_1(k) \in [\pi/12, 7\pi/12, 13\pi/12, 19\pi/12]$ and $\phi_2(k) \in [11\pi/6, 5\pi/6, 4\pi/3, \pi/3]$, and $B=(2+\sqrt{3})^{1/2}\times A$ When this scheme is applied to the perturbation method disclosed in JP 2012-075097 A described before, the number of possible values taken by the product of the three terms of the amplitude $A_k^{H/V}$ expressed in the aforementioned Equation (C) can be reduced from 128 in the case of 8QAM to 4 in the case of QPSK.

In the case of FIG. 6 (8PSK signal), an 8PSK signal can be expressed as in Equation (3.1) below (see a frame 100 in FIG. 6). In this case, the approximate symbol generator 21 generates an approximate symbol (QPSK symbol) $u''(k)$, as indicated in Equation (3.2) below (see a frame 200 in FIG. 6):

$$u(k)=A\exp(j\phi_1(k)) \quad (3.1)$$

$$u''(k)=B\exp(j\phi_2(k)) \quad (3.2)$$

where $\phi_1(k) \in [0, \pi/4, \pi/2, 3\pi/4, \pi, 5\pi/4, 3\pi/2, 7\pi/4]$, $\phi_2(k)-\pi/8\epsilon [\pi/4, 3\pi/4, 5\pi/4, 7\pi/4]$, or $\phi_2(k)+\pi/8\epsilon [\pi/4, 3\pi/4, 5\pi/4, 7\pi/4]$, and $A=B$.

When this scheme is applied to the perturbation method disclosed in JP 2012-075097 A described before, the number of possible values taken by the product of the three terms of the amplitude $A_k^{H/V}$ expressed in the aforementioned Equation (C) can be reduced from 8 in the case of 8PSK to 4 in the case of QPSK.

The non-linear distortion calculator 22 illustrated in FIG. 3 calculates the non-linear distortion based on the approximate symbol generated by the approximate symbol generator 21 as described above. For example, the non-linear distortion calculator 22 calculates the non-linear distortion occurred in every symbol based on transmission line information, channel information, and the approximate symbol.

As an example of the transmission path information, a transmission path length or a kind of optical fiber (a dispersion coefficient, an attenuation coefficient, a non-linear coefficient, or the like) can be exemplified. As an example of the channel information, a symbol rate, optical power input to an optical fiber, a central wavelength, or the like can be exemplified. For example, the transmission path information and the channel information can be stored in a memory (not illustrated) of the DSP 111, and the non-linear distortion calculator 22 appropriately reads information (parameter) used to calculate the non-linear distortion from the memory and calculates the non-linear distortion. Here, since the number of possible values taken by the product of the three terms of the amplitude $A_k^{H/V}$ expressed in Equation (C) in the approximate symbol generator 21 is reduced, as described above, the calculation complexity of the non-linear distortion can be reduced and the circuit scale for the calculation can be reduced.

The non-linear compensator 23 performs non-linear distortion pre-equalization on the transmission signal based on the non-linear distortion calculated by the non-linear distortion calculator 22. For example, the non-linear compensator 23 subtracts the non-linear distortion calculated by the non-linear distortion calculator 22 from the symbol of the transmission signal.

Figure 7:
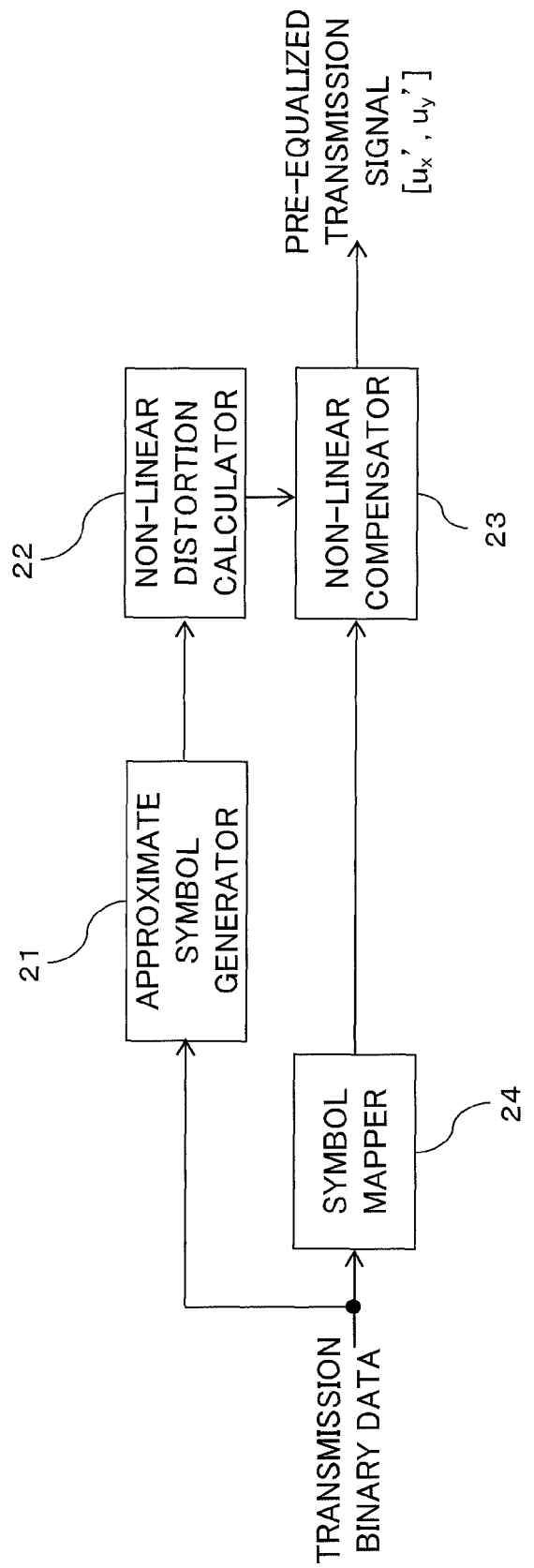
FIG. 7 is a block diagram for describing an example of a configuration in which the approximate symbol generator illustrated in FIG. 3 generates an approximate symbol from transmission binary data.
Figure 8:
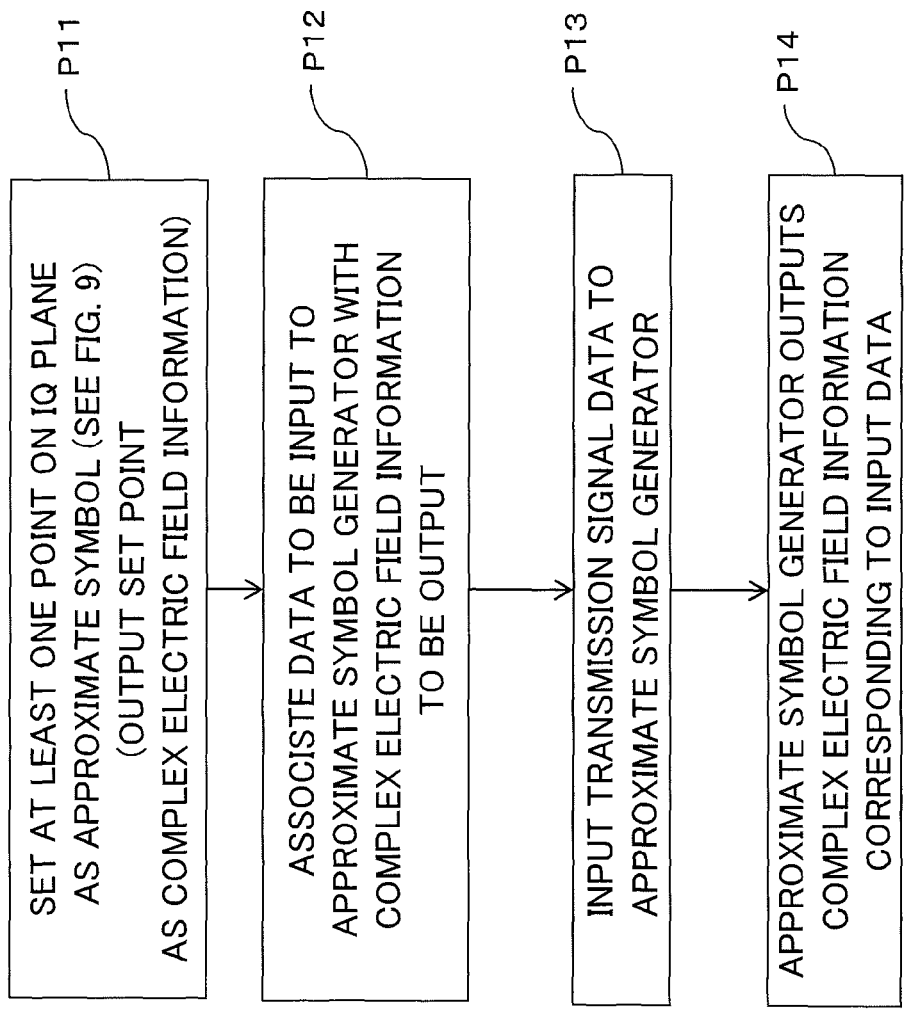
FIG. 8 is a flowchart illustrating a processing example in which the approximate symbol generator generates an approximate symbol from the transmission binary data in the configuration illustrated in FIG. 7.
Figure 9:
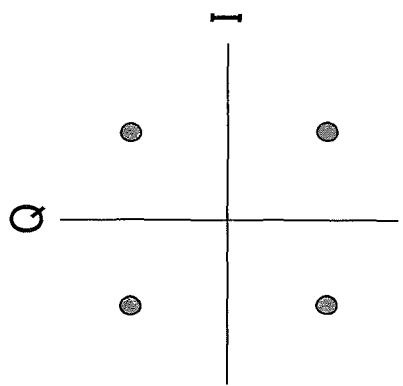
FIG. 9 is a diagram illustrating a setting example of the approximate symbol in the process illustrated in FIG. 8.
Figure 10:
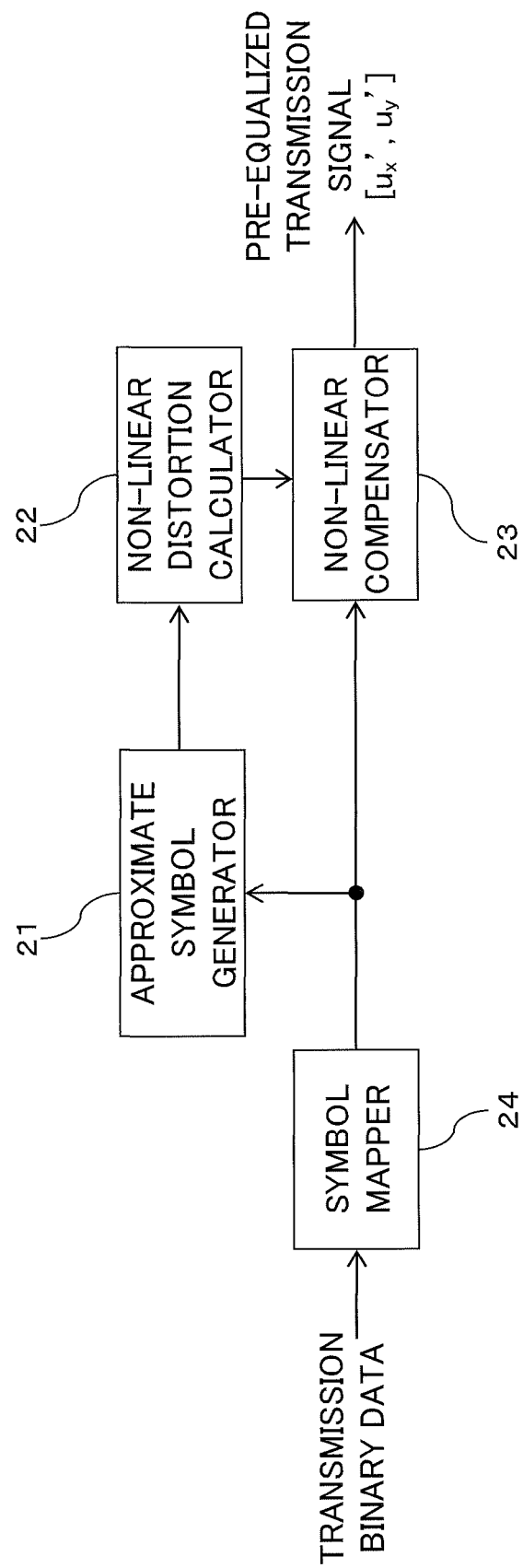
FIG. 10 is a block diagram illustrating an example of a configuration in which the approximate symbol generator illustrated in FIG. 3 generates an approximate symbol from a signal mapped to electric field information.
Figure 11:
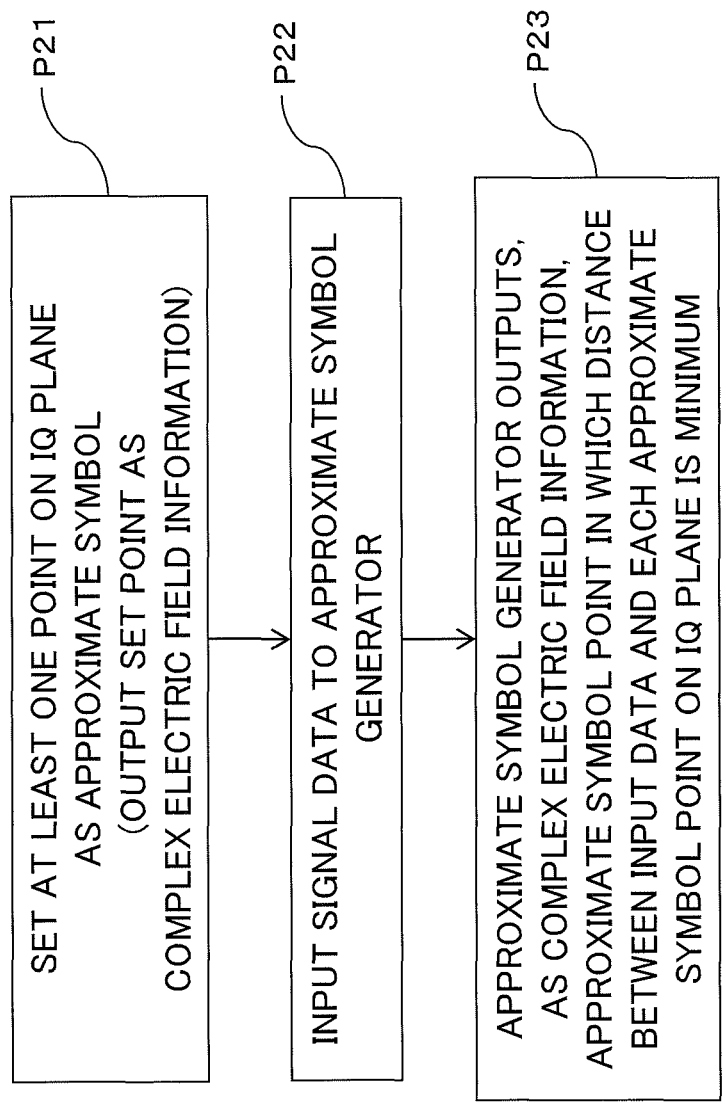
FIG. 11 is a flowchart illustrating a processing example in which the approximate symbol generator generates an approximate symbol from a signal mapped to electric field information in the configuration illustrated in FIG. 10.
Figure 12:
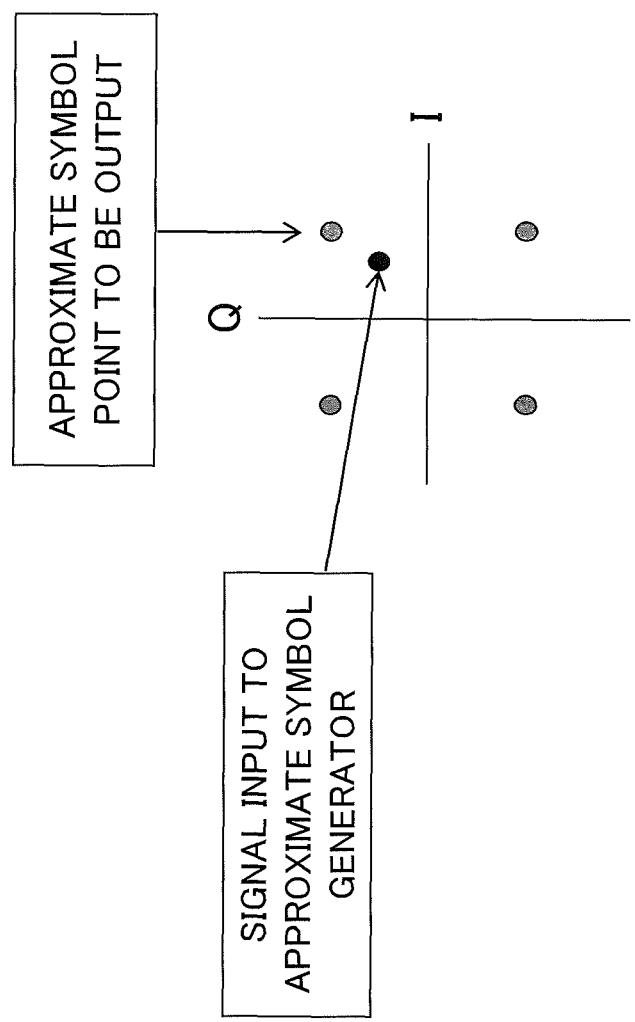
FIG. 12 is a diagram illustrating a relation between a signal input to the approximate symbol generator and a signal output from the approximate symbol generator in the process illustrated in FIG. 11.

The approximate symbol generator 21 may generate an approximate symbol from transmission data (binary data), as illustrated in FIGS. 7 to 9, or may generate an approximate symbol from a signal mapped to an electric field information, as illustrated in FIGS. 10 to 12.

In a configuration illustrated in FIG. 7, the approximate symbol generator 21 generates an approximate symbol from transmission binary data before mapping to the electric filed information in a symbol mapper 24. The symbol mapper 24 is an example of a second signal generator and maps the transmission binary data to a symbol (electric field information) with a multivalued level (16QAM as a non-restrictive example) greater than a multivalued level of the approximate symbol generated by the approximate symbol generator 21. The symbol mapper 24 may be realized, for example, as an exemplary function of the DSP 111, as in the approximate symbol generator 21, the non-linear distortion calculator 22, and the non-linear compensator 23.

As illustrated in FIG. 8, for example, the approximate symbol generator 21 sets at least one point on an IQ plane as an approximate symbol (the set point is output as complex electric field information) (process P11). For example, when a QPSK symbol is generated as the approximate symbol, the approximate symbol generator 21 sets at least one point of symbols of four points on the IQ plane illustrated in FIG. 9.

Subsequently, as illustrated in FIG. 8, the approximate symbol generator 21 associates the binary data to be input to the approximate symbol generator 21 with the complex electric field information to be output (process P12). For example, in a QAM symbol mapped with the Gray code, two specific bits among 4 bits represent a quadrant in which the symbol is positioned on the IQ plane. Thus, the approximate symbol generator 21 extracts the two bits representing the quadrant of the IQ plane from the input transmission binary data and generates a QPSK symbol corresponding to the quadrant as an approximate symbol from the extracted two bits.

Thereafter, binary data which is transmission signal data is input to the approximate symbol generator 21 (process P13) and then the approximate symbol generator 21 outputs the complex electric field information corresponding to the input binary data (process P14).

Meanwhile, in a configuration illustrated in FIG. 10, the approximate symbol generator 21 generates an approximate symbol from signal data after the symbol mapper 24 maps the transmission binary data to the electric field information. For example, as illustrated in FIG. 11, the approximate symbol generator 21 sets at least one point as a representative point on an IQ plane as an approximate symbol (the set point is output as complex electric field information) (process P21). A method of setting the representative point is not limited. However, for the purpose of simplifying the calculation, it is preferable to set a symbol point of a multivalued level lower than a multivalued level of a symbol generated by the symbol mapper 24.

Thereafter, the signal data is input from the symbol mapper 24 to the approximate symbol generator 21 (process P22). The approximate symbol generator 21 outputs, as complex electric field information, the approximate symbol point in which a distance between the input signal data and each approximate symbol point on the IQ plane is minimum (process P23). In other words, the approximate symbol generator 21 re-maps the input signal represented as the electric field information to a point in which the distance is minimum among the representative points.

For example, when a QPSK symbol is generated as the approximate symbol, as illustrated in FIG. 12, the signal data mapped to the first quadrant of the IQ plane by the symbol mapper 24 has the minimum distance with an approximate symbol point positioned in the first quadrant among four approximate symbol points. Accordingly, the approximate symbol generator 21 outputs the QPSK symbol positioned in the first quadrant as the approximate symbol.

Figure 13:
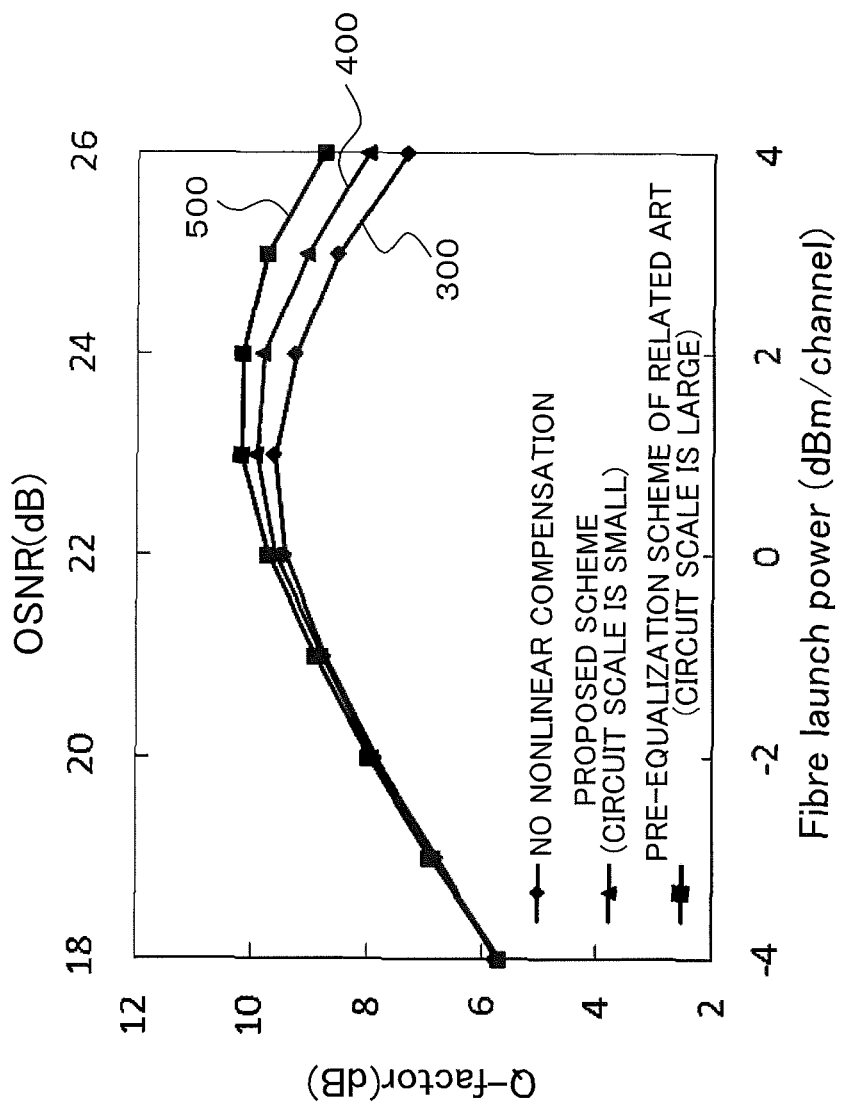
FIG. 13 is a diagram illustrating an example of a transmission simulation result of non-linear pre-equalization using the approximate symbols illustrated in FIGS. 3 to 12.

FIG. 13 illustrates an example of a transmission simulation result of the non-linear pre-equalization using the above-described approximate symbol. In FIG. 13, the vertical axis represents a Q-factor and the horizontal axis represents an input optical power to an optical fiber per channel and an optical signal-to-noise ratio (OSNR). Here, the Q-factor is calculated from a bit error rate. The transmission signal is set to, for example, an 11-wavelength multiplexed signal of dual polarization (DP)—16QAM of 254 Gbit/s.

In FIG. 13, reference numeral 300 denotes transmission characteristics in the case of no non-linear compensation, reference numeral 400 denotes transmission characteristics when non-linear pre-equalization using the approximate symbol is performed, and reference numeral 500 denotes transmission characteristics when non-linear compensation disclosed in JP 2012-075097 A is performed. As understood from the transmission characteristics 300 and 400, the Q-factor corresponding to a reception bit error ratio can be improved by about 0.33 dB in a region in which the input optical power is 0 or more, compared to the case of no non-linear compensation. Meanwhile, an improvement effect of the Q-factor of the transmission characteristics 400 is less than that of the transmission characteristics 500. However, since the calculation amount of the non-linear distortion can be reduced, as described above, the circuit scale and the power consumption can be reduced further than in JP 2012-075097 A.

Figure 14:
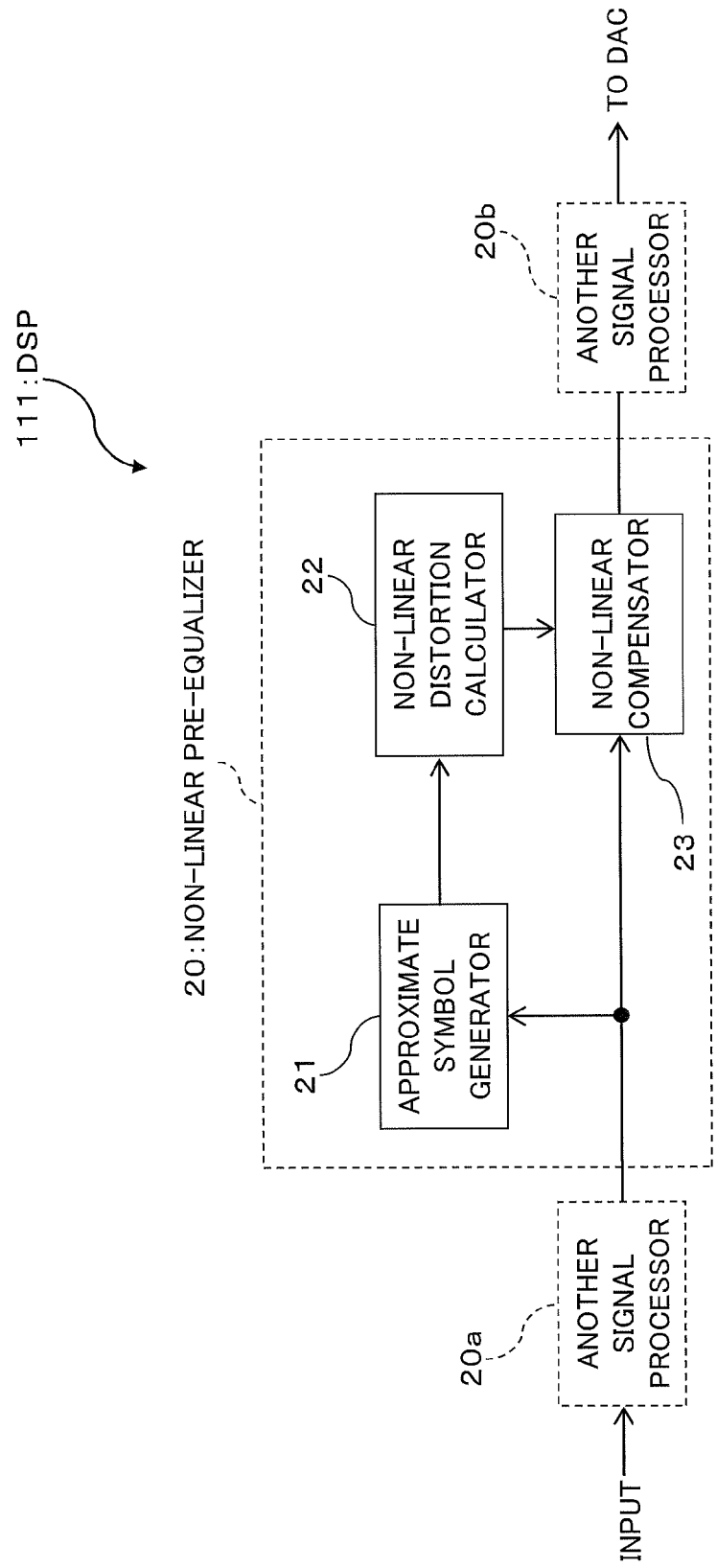
FIGS. 14 and 15 are block diagrams illustrating modification examples of the configuration illustrated in FIG. 3.

As illustrated in FIG. 14, one of or both of a signal processor 20*a* and a signal processor 20*b* that performs other signal processing may be provided in one or both of the front stage and the post stage of the non-linear pre-equalizer 20. Examples of the other signal processing may include error correction, compensation of incompleteness of a transmission device (such as amplifier), adjustment of the frequency of a transmission signal, and pulse shaping of a transmission signal.

Figure 15:
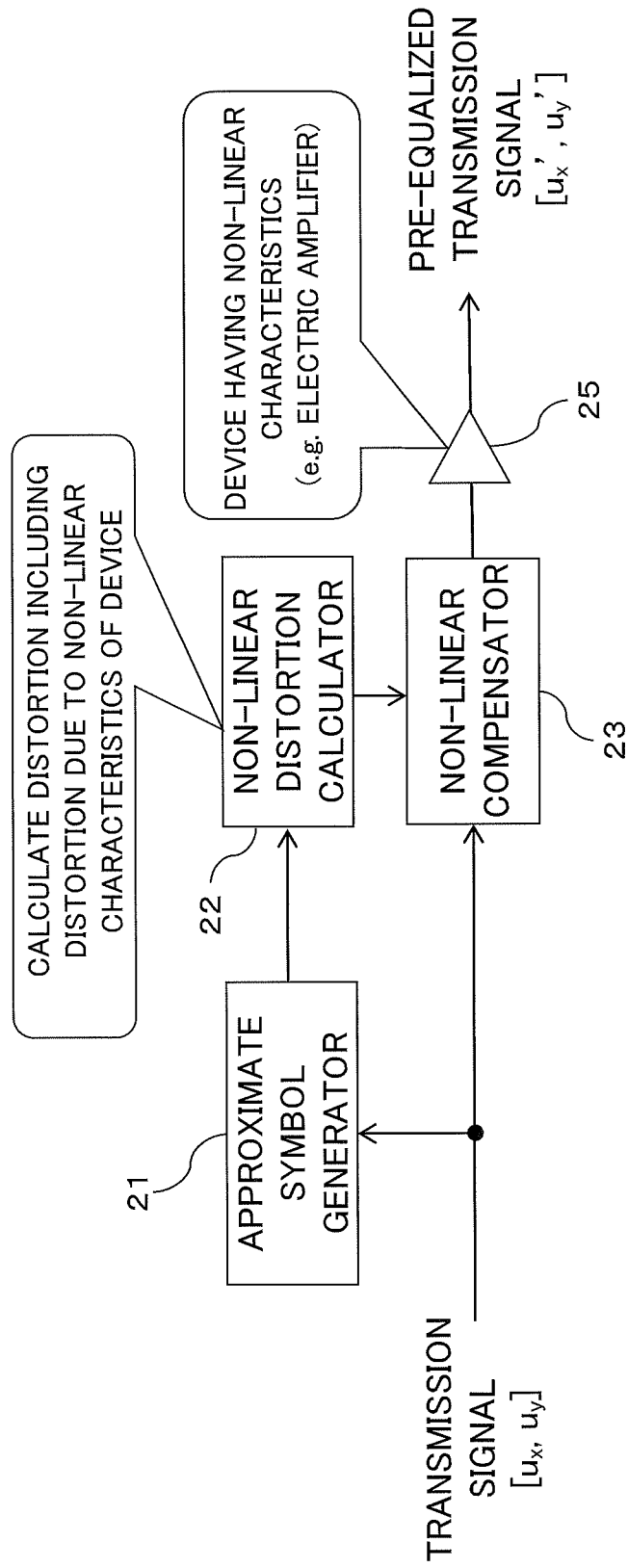

The non-linear pre-equalizer 20 according to the embodiment is not limited to the compensation of signal deterioration due to non-linearity of an optical fiber, but may also be used for compensation of signal deterioration caused by non-linearity of a device included in a transmitter. For example, the non-linear pre-equalizer 20 may be applied to a transmitter for wireless communication. In this case, for example, as illustrated in FIG. 15, the non-linear distortion calculator 22 may calculate non-linear distortion including distortion caused by a device (for example, an electric amplifier) 25 having non-linear characteristics.

In the above-described embodiment, the example in which the non-linear distortion compensation using the approximate symbol is applied as the non-linear pre-equalization to a transmission side has been described. However, the non-linear distortion compensation using the approximate symbol may be applied to a reception side.

Figure 16:
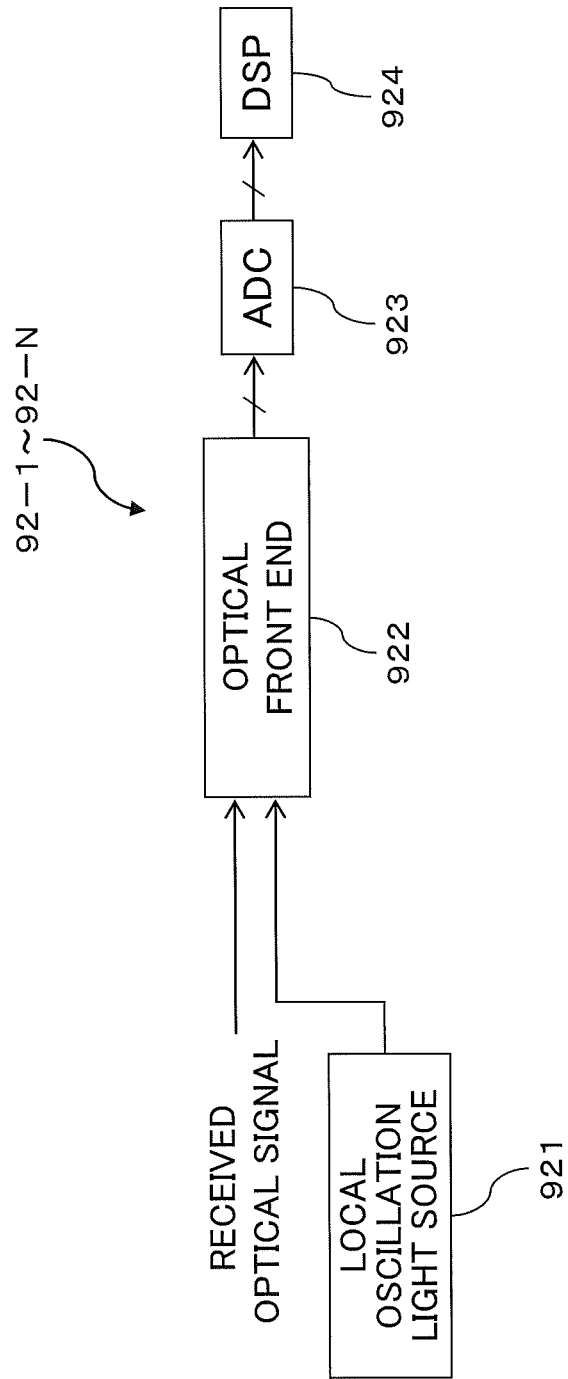
FIG. 16 is a block diagram illustrating an example of the configuration of an optical receiver illustrated in FIG. 1.

For example, as illustrated in FIG. 16, each of the optical receivers 92-1 to 92-N illustrated in FIG. 1 includes a local oscillation light source 921, an optical front end 922, an analog-digital converter (ADC) 923, and a DSP 924. The DSP 924 performs non-linear distortion compensation using an approximate symbol. The optical front end 922 has a function of demodulating and photoelectrically-converting the received optical signal using local light of the local oscillation light source 921 a received optical signal using local oscillation light from the local oscillation light source 921. The ADC 923 converts the reception analog electric signal photoelectrically-converted by the optical front end 922 into a digital signal and inputs the digital signal to the DSP 924.

Figure 17:
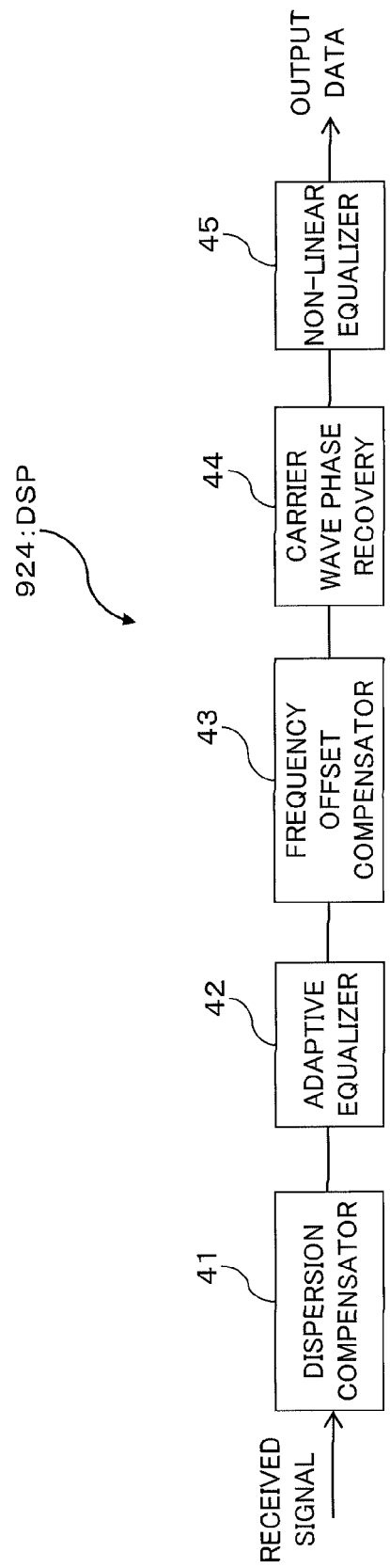
FIG. 17 is a block diagram illustrating an example of a functional configuration realized by a DSP illustrated in FIG. 16.
Figure 18:
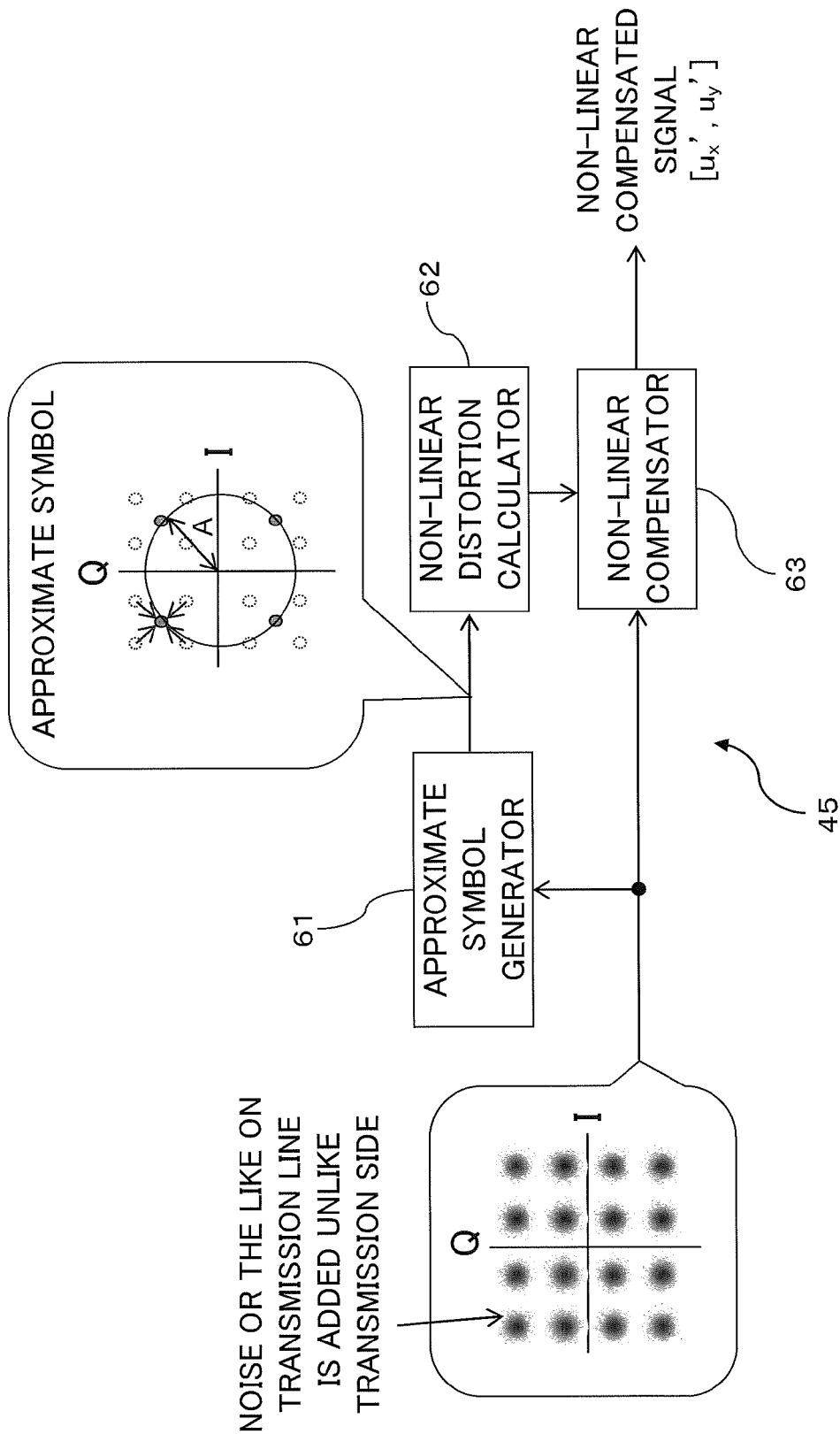
FIG. 18 is a block diagram illustrating an example of the configuration of a non-linear equalizer illustrated in FIG. 17.

The DSP 924 is an example of an arithmetic processing circuit and performs signal processing including non-linear distortion compensation on the received digital electric signal input from the ADC 923 using the above-described approximate symbol. For example, as illustrated in FIG. 17, the DSP 924 may include, upon focusing on a functional configuration thereof, a dispersion compensator 41, an adaptive equalizer 42, a frequency offset compensator 43, a carrier wave phase recovery 44, and a non-linear equalizer 45. As illustrated in FIG. 18, the non-linear equalizer 45 may include an approximate symbol generator 61, a non-linear distortion calculator 62, and a non-linear compensator 63. The non-linear equalizer 45 may be provided in the post stage of the carrier wave phase recovery 44. Another signal processor may be inserted at any stages between the dispersion compensator 41 to the non-linear equalizer 45. Further, the dispersion compensator 41, the adaptive equalizer 42, or the frequency-offset compensator 43 may be unnecessary in some cases.

The dispersion compensator 41 compensates, for example, wavelength dispersion occurred in the received signal (digital signal) by the digital signal processing. By performing compensation of the wavelength dispersion using the digital signal processing, an optical device such as a wavelength diversion compensation fiber (DCF) may be unnecessary for the optical transmission line. Therefore, it is possible to obtain the advantages of suppressing an increase in optical noise occurred in compensation of DCF loss and suppressing wavelength distortion due to a non-linear optical effect in the DCF. Further, it is also possible to obtain the advantage of flexibly changing a dispersion compensation amount. When wavelength dispersion compensation is performed optically using the DCF or the like, the dispersion compensator 41 may be unnecessary.

The adaptive equalizer 42 performs, for example, polarization processing including a separation of polarized components or a polarization mode dispersion (PMD) compensation (adaptive equalization) on the received signal (digital signal). The adaptive equalization is possible to compensate, by using a plurality of linear filters, polarization change and PMD waveform distortion according to time varying at a high speed by adaptively updating parameters of the linear filters at a sufficiently higher speed than that of the polarization change of the signal light in the optical fiber.

The frequency offset compensator 43 compensates (or correct) a frequency offset between the received signal and the local oscillation light. For example, the frequency offset compensator 43 compensates a frequency offset by estimating a frequency offset from the received signal and applying reverse phase rotation corresponding to the estimated frequency offset to the received signal. The frequency offset estimation may be performed by using, for example, an estimation method called an exponentiation method or an estimation method called a pre-decision based angle differential frequency offset Estimator (PADE) method which is possible to extend an estimation range in comparison with the exponentiation method.

The carrier wave phase recovery (carrier phase estimator) 44 estimates and recovers a correct phase of the carrier by removing an amplified spontaneous emission (ASE) noise occurred in the optical amplifier 30 or a laser phase noise from the received signal. The carrier phase estimation may be performed by using, for example, a feedback method which is possible to remove an effect of noise using a digital loop filter or a feed forward method which is possible to remove an effect of noise by averaging estimated phase differences detected by a phase detector.

The non-linear equalizer 45 compensates non-linear distortion occurred in the received signal according to the same scheme as that of the above-described non-linear pre-equalizer 20. For example, as illustrated in FIG. 18, the non-linear equalizer 45 generates an approximate symbol from the received signal, calculates non-linear distortion based on the generated approximate symbol, and compensates the non-linear distortion based on the calculation result.

Specifically, as in the approximate symbol generator 21 illustrated in FIG. 10, the approximate symbol generator 61 generates an approximate symbol with a multivalued level lower than a multivalued level of a received signal from the received signal in which binary data is mapped to electric field information. However, noise or the like in the optical transmission line 50 is added to the received signal. For example, the approximate symbol generator 61 outputs, as complex electric filed information, an approximate symbol point in which a distance between received signal data and each approximate symbol point on the IQ plane is minimum.

The non-linear distortion calculator 62 calculates non-linear distortion based on the approximate symbol generated by the approximate symbol generator 61. For example, the non-linear distortion calculator 62 calculates non-linear distortion occurred in every symbol based on transmission line information, channel information, and the approximate symbol.

As an example of the transmission line information, a transmission line length or a kind of optical fiber (a dispersion coefficient, an attenuation coefficient, a non-linear coefficient, or the like) can be exemplified. As an example of the channel information, a symbol rate, optical power input to an optical fiber, a central wavelength, or the like can be exemplified. For example, the transmission line information and the channel information can be stored in a memory (not illustrated) of the DSP 924, and the non-linear distortion calculator 62 appropriately reads information (parameter) used to calculate the non-linear distortion from the memory and calculates the non-linear distortion. Here, since the number of possible values taken by the product of the three terms of the amplitude $A_k^{H/V}$ expressed in the aforementioned Equation (C) in the approximate symbol generator 61 is reduced, as described above, the calculation complexity of the non-linear distortion can be reduced and the circuit scale for the calculation can be reduced.

The non-linear compensator 63 performs non-linear distortion on the received signal based on the non-linear distortion calculated by the non-linear distortion calculator 62. For example, the non-linear compensator 63 subtracts the non-linear distortion calculated by the non-linear distortion calculator 62 from the corresponding symbol of the received signal.

(Others)

In the above-described embodiment, the QAM signals (M-QAM signals) having multivalued levels M are degenerated to QPSK signals of another modulation scheme in which a multivalued level is lower than M in the approximate symbol generator 21 (or 61). However, the QAM signals may be degenerated to signals modulated by the same modulation scheme. For example, 256 QAM signals or 64 QAM signals may be degenerated to 16 QAM signals having lower multivalued levels.

In the above-described embodiment, the non-linear distortion compensation using the approximate symbol is applied to the transmission side or the reception side of the WDM optical transmission system 1. However, the non-linear distortion compensation may be applied to a transmission side or a reception side of an optical communication system transmitting an optical signal having a single wavelength.

According to the above-described technology, it is possible to reduce the complexity of calculation for compensation of non-linear distortion and reduce the circuit scale of a signal processing circuit.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. An optical transmitter comprising:
    a digital signal processor (DSP) configured to:
        perform a predetermined non-linear distortion calculation on a combination of possible amplitude components of a transmission signal, the possible amplitude components being caused being changed depending on a multivalued level and non-linear effect of the transmission signal;
        subtract the resultant non-linear distortion calculation from the transmission signal to preliminarily compensate the non-linear distortion of the transmission signal;
        re-map a transmission signal with a first multivalued level to a transmission signal with a second multivalued level lower than the first multivalued level;
        apply the re-mapped transmission signal with the second multivalued level into the predetermined non-linear distortion calculation;
    a digital-analog converter (DAC) configured to convert the signal with the first multivalued level compensated the non-linear distortion as a digital signal by the DSP into a analog signal; and
    an output port configured to output the analog signal converted by the DAC.

2. The optical transmitter according to claim 1, the DSP configured:
    to generate the signal with the first multivalued level by mapping transmission binary data to electric field information, and
    to generate the signal with the second multivalued level from the transmission binary data by using the transmission binary data before the mapping to the electric field information as the transmission signal.

3. The optical transmitter according to claim 1, the DSP configured:
    to generate a signal with the first multivalued level by mapping transmission binary data to electric field information, and
    to generate the signal with the second multivalued level from the signal with the first multivalued level by using the signal with the first multivalued signal obtained by mapping the transmission binary data to the electric field information as the transmission signal.

4. The optical transmitter according to claim 1, wherein the non-linear distortion is non-linear distortion occurred in accordance with the non-linear effect of an optical transmission line or a wireless transmission line through which the signal with the first multivalued level is transmitted.

5. The optical transmitter according to claim 1, wherein the non-linear distortion is non-linear distortion occurred in accordance with the non-linear effect of an optical device or an electric device related to transmission of the signal with the first multivalued level.

6. A communication apparatus comprising:
    the optical transmitter according to claim 1.

7. A method of compensating non-linear distortion comprising:
    performing, by a digital signal processor (DSP), a predetermined non-linear distortion calculation on a combination of possible amplitude components of a transmission signal, the possible amplitude components being caused being changed depending on a multivalued level and non-linear effect of the transmission signal;
    subtracting, by the DSP, the resultant non-linear distortion calculation from the transmission signal to preliminarily compensate the non-linear distortion of the transmission signal;
    re-mapping, by the DSP, a transmission signal with a first multivalued level to a transmission signal with a second multivalued level lower than the first multivalued level;
    applying, by the DSP, the re-mapped transmission signal with the second multivalued level into the predetermined non-linear distortion calculation;
    converting, by a digital-analog converter (DAC), the signal with the first multivalued level compensated the non-linear distortion as a digital signal by the DSP into a analog signal; and
    outputing, through an output port, the analog signal converted by the DAC.

8. An optical receiver comprising:
    a local oscillation light source configured to generate local light;

an optical front end configured to demodulate and photoelectrically-covert the signal with the first multivalued level using the local light of the local oscillation light source;

an analog-digital converter (ADC) configured to convert the signal with the first multivalued level photoelectrically-coverted by the optical front end into a digital signal; and a digital signal processor (DSP) configured to:
perform a predetermined non-linear distortion calculation on a combination of possible amplitude components of a reception signal, the possible amplitude components being caused being changed depending on a multivalued level and non-linear effect of the reception signal;

subtract the resultant non-linear distortion calculation from the reception signal to preliminarily compensate the non-linear distortion of the reception signal;

re-map a reception signal with a first multivalued level to a reception signal with a second multivalued level lower than the first multivalued level;

apply the re-mapped reception signal with the second multivalued level into the predetermined non-linear distortion calculation.

9. The optical receiver according to claim 8, wherein the reception signal is the signal with the first multivalued level received through a transmission line.

* * * * *